Sept. 12, 1961  M. E. ESTEY  2,999,728
PISTON RING ASSEMBLY
Filed March 27, 1957  2 Sheets-Sheet 1
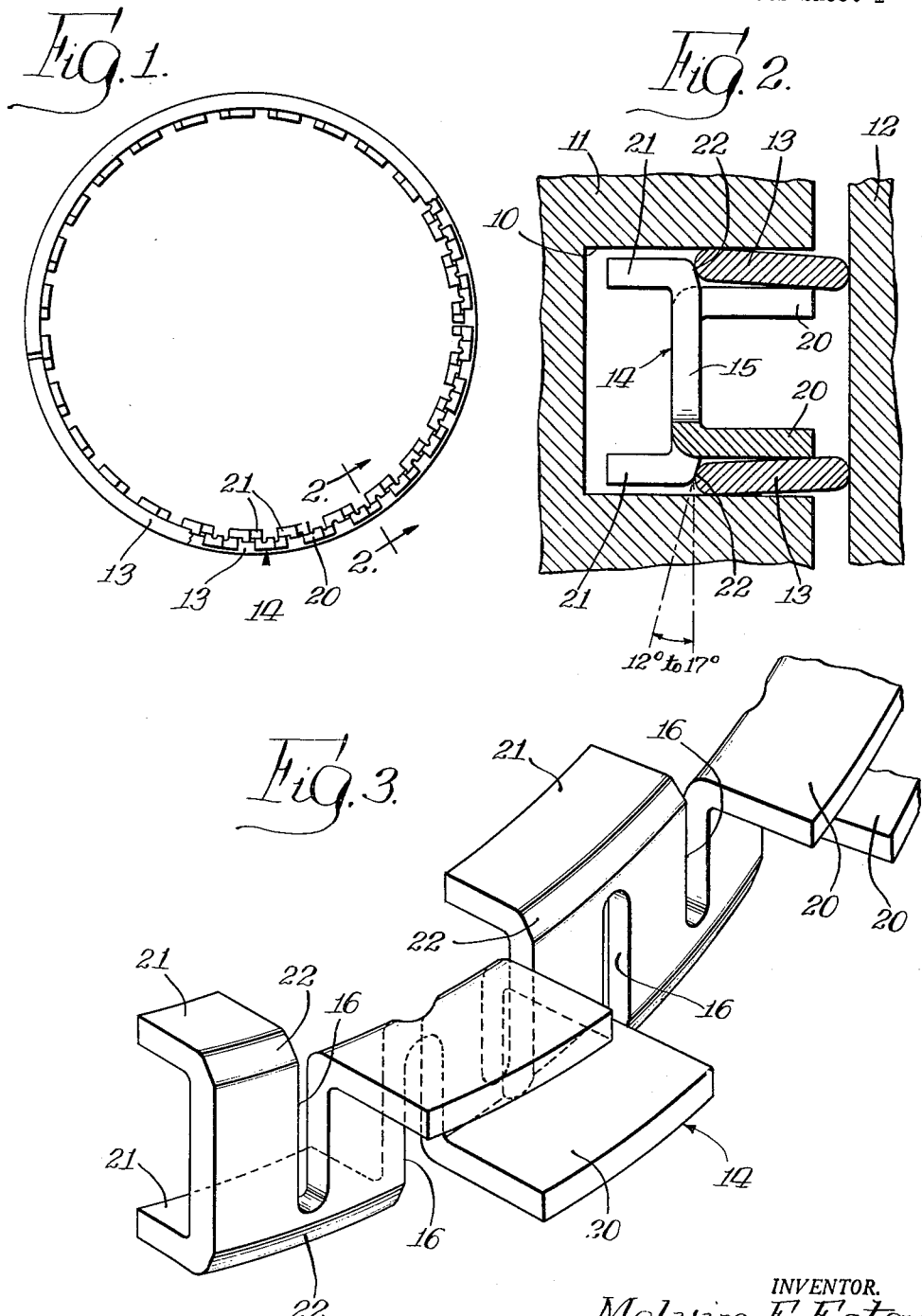
INVENTOR.
Melvin E. Estey,
BY
Davis, Lindsey, Hibben & Noyes
Atty's.

Sept. 12, 1961 M. E. ESTEY 2,999,728
PISTON RING ASSEMBLY
Filed March 27, 1957 2 Sheets-Sheet 2
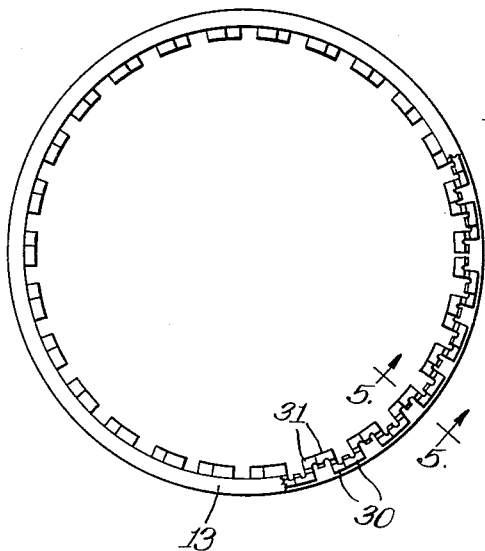
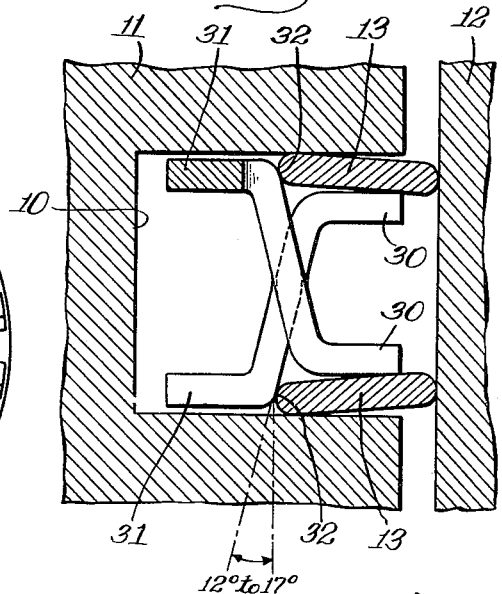
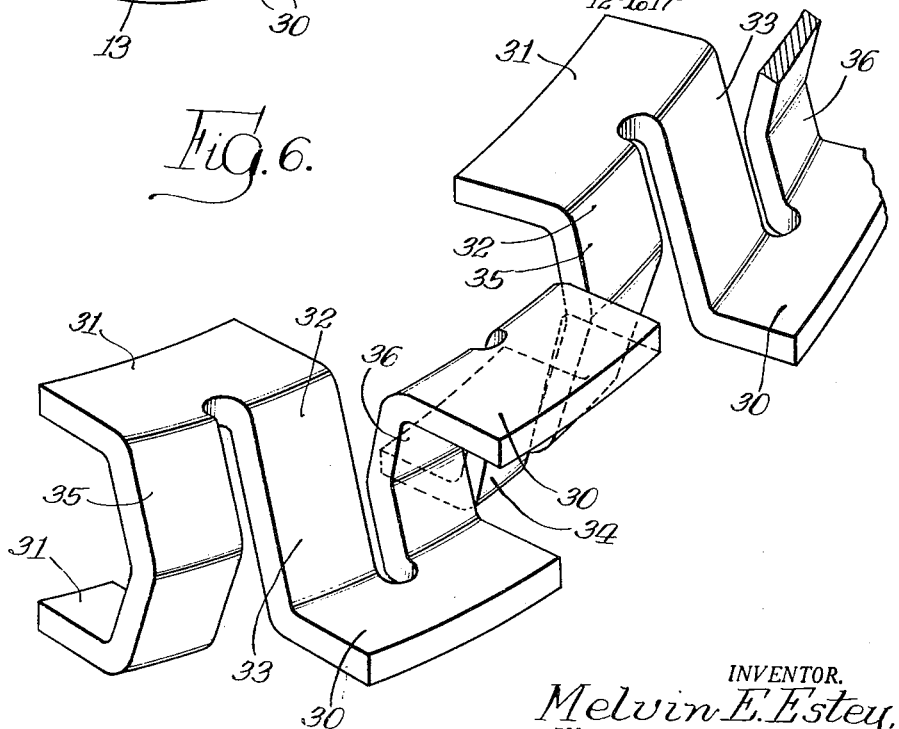
INVENTOR.
Melvin E. Estey,
BY Davis, Lindsey, Hibben & Noyes
Attys.

United States Patent Office 2,999,728
Patented Sept. 12, 1961

2,999,728
PISTON RING ASSEMBLY
Melvin E. Estey, Hagerstown, Ind., assignor to Perfect Circle Corporation, Hagerstown, Ind., a corporation of Indiana
Filed Mar. 27, 1957, Ser. No. 648,937
15 Claims. (Cl. 309—45)

The invention relates generally to piston rings and more particularly to a piston ring assembly for use in an internal combustion engine or the like.

The general object of the invention is to provide a novel piston ring assembly comprising a combined spacer expander and one or more rails.

Another object is to provide a novel piston ring assembly including a pair of rails which are radially narrower than those heretofore usually employed.

A further object is to provide a novel piston ring assembly comprising a combined spacer-expander and a pair of rails which are narrower than those usually employed but which are held properly positioned by the spacer-expander when placed in the groove of the piston before being compressed for insertion into the cylinder, so that the assembly may then be compressed for such insertion without encountering difficulties due to distortion of either the rails or the spacer-expander.

Other objects and advantages will become apparent from the following description taken in connection with the accompanying drawings, in which:

FIG. 1 is a plan view of a piston ring assembly embodying the features of the invention;

FIG. 2 is an enlarged sectional view taken on the line 2—2 of FIG. 1 and showing the piston ring assembly mounted on a piston within a cylinder;

FIG. 3 is a fragmentary perspective view of the spacer-expander forming part of the ring assembly;

FIG. 4 is a plan view similar to FIG. 1 but showing a modified form of piston ring assembly;

FIG. 5 is an enlarged sectional view taken on the line 5—5 of FIG. 4, similar to FIG. 2; and FIG. 6 is a fragmentary perspective view of the spacer-expander forming part of the ring assembly of FIG. 4.

A ring assembly embodying the features of the invention is of the type comprising a combined spacer-expander and one or more cylinder-engaging rails. A rail, when free, of course expands to a size greater than the bore of the cylinder in which it is to operate, and the rail must therefore be compressed when inserted into the cylinder. However, a rail, because of its shape, has a tendency to distort on being compressed, and should therefore be held against such distortion while being compressed. Moreover, it must be held in proper relation to the spacer-expander and the side of the groove in the piston when compressed.

A rail of the character heretofore usually employed is of sufficient radial width to make the width of the ring assembly such that at least a portion of the rail lies within the groove throughout the entire circumference of the rail before the assembly is compressed on insertion into the cylinder, and the rail is thus held in proper relation to the spacer-expander and the side of the groove. However, if the rail were radially narrower and the spacer-expander were correspondingly narrower, pushing the assembly into the groove until it contacted the bottom of the groove at one side of the piston would cause the entire radial width of the rail at the diametrically opposite point to lie entirely outside of the groove. The rail would thus not be held in proper position and difficulties would be encountered in compressing it for insertion in the cylinder, particularly because of the tendency of the rail to distort when compressed.

A piston ring assembly embodying the invention permits the use of rails that are narrower than those usually employed, but the assembly as a whole has sufficient radial width to maintain at least a portion of each rail in the groove throughout the entire circumference thereof, even when the rails are free and the assembly is pushed into the groove at one side of the piston until it contacts the bottom of the groove.

The present piston ring assembly is utilized as an oil-control ring usually on a piston of an internal combustion engine although the ring assembly is not limited to such use. For purposes of illustration, the ring assembly is shown, in FIG. 2, as mounted in a groove 10 in a piston fragmentarily shown at 11, a portion of the cylinder in which the piston operates being shown at 12. The ring assembly comprises at least one but preferably a pair of cylinder engaging rails 13 which are shown as having rounded inner and outer edges. The rails 13 are positioned at the respective sides of the groove 10 and are held in axially spaced relation, in this instance, by a combined positioning or spacing and expanding means indicated generally at 14.

In the ring assemblies shown herein, the rails are narrower than those heretofore generally employed, and for the reason heretofore mentioned, the assembly is given sufficient radial width to maintain at least a portion of each rail in the groove 10 throughout the entire circumference thereof, by making the spacer-expander 14 of sufficient radial width. To the end, the spacer-expander extends inward from the inner periphery of each rail a sufficient distance to give the assembly as a whole the desired radial width. Thus, the spacer-expander 14 comprises a circumferentially expansible structure having portions extending radially outward for holding each rail at one side of the groove, and portions extending radially inward and forming shoulders abutting the inner periphery of the rail or rails to force each rail radially outward.

In the ring assembly shown in FIGS. 1, 2 and 3, the spacer-expander 14 is arranged to coact with a pair of axially spaced rails 13, although it will be apparent that it might be constructed to coact with only one rail. In the spacer-expander 14, in this embodiment, the circumferentially expansible structure comprises a plurality of circumferentially spaced, axially extending web members 15 connected at their ends by segments. The segments and web members are formed by slotting a strip of sheet metal alternately from opposite edges, the slots appearing in the finished spacer-expander at 16 between the web members 15.

The segments connecting the web members 15 are in two series at the respective ends of the web members, and each series comprises two rows, one row comprising segments 20 bent to extend radially outwardly from the web members 15 and holding the rails 13 at the respective sides of the groove 10. The other row of each series comprises segments 21 bent to extend radially inwardly from the web members 15. The segments 21 in each series alternate with and are in staggered relation to the segments 20. Because the segments are formed by slotting as above described, each inwardly extending segment 21 is connected by web members 15 to one of the segments 21 and to one of the segments 20 in the opposite series, and each outwardly extending segment 20 is connected by web members 15 to one of the segments 21 and to one of the segments 20 in the opposite series.

The bends between the segments 21 and their associated web members are positioned to bear outwardly against the inner peripheries of the rails 13, so that the expansive force of the spacer-expander 14 urges the rails outwardly. Thus, these bends provide shoulders 22 bearing against the rails. With the bends positioned in this manner, the planes of the rows of segments 21 lie axially outside of the planes of the rows of segments 20 and the rows of segments 21 are thus axially spaced apart a greater distance than the rows of segments 20.

The spacer-expander 14, in addition to forcing the rails radially outward, also function to cause the rails to dish with the inner peripheries of the rails bearing against the sides of the groove 10 to provide a seal, particularly at the upper side of the groove, preventing oil from being drawn from the bottom of the groove to the cylinder above the upper rail. To this end, with the web members 15 extending axially, the shoulders 22 are formed at such an angle as to cause the rails to dish toward the sides of the groove at their inner peripheries, as well as to force the rails radially outward. Thus, the shoulders 22 are formed at a small angle to an axially extending line, the angle being preferably 12° to 17°. With such an angle, the rails at their inner peripheries bear against the sides of the grooves with sufficient pressure to provide a seal but not enough to interfere with free outward movement of the rails to provide the desired pressure against the cylinder wall. The embodiment of the invention shown in FIGS. 4, 5 and 6 is similar in form and function to that shown in FIGS. 1, 2 and 3 but differs in the form of the web members. Thus in the embodiment shown in FIGS. 4, 5 and 6, the spacer-expander comprises two series of segments at the respective sides of the groove, each series comprising a row of segments 30 bent to extend radially outward from the web members and a row of segments 31 bent to extend radially inward. The plane of each row of segments 31 lies axially outside of the plane of the row of segments 30 in the same series so that the two rows of segments 31 are axially spaced farther apart than the two rows of segments 30. The segments 31 alternate with and are in staggered relation to the segments 30 in each series.

The bends connecting the segments 31 with the web members form shoulders 32 to bear against the inner peripheries of the rails 13. The shoulders 32 are also at a small angle to an axially extending line to cause the rails to dish to effect a seal with the sides of the groove at their inner peripheries. However, instead of having the web members extending truly axially and forming only the shoulders at such an angle, each web member is formed at such angle so that the angle of the shoulders results from the shape and position of the web members. Thus, each web member, indicated at 33, connecting one of the outwardly extending segments 30 in the lower series with an inwardly extending segment 31 in the upper series is straight and extends upward and inwardly at the desired angle, while each web member, indicated at 34, connecting one of the inwardly extending segments 31 in the lower series with an outwardly extending segment 30 in the upper series is likewise straight but extends upwardly and outwardly at the desired angle.

The web memebrs, indicated at 35, connecting inwardly extending segments 31 in the two series are transversely bent intermediate their ends to provide upper and lower portions of the proper angle. The web members, indicated at 36, connecting outwardly extending segments 30 in the two series are likewise bent transversely intermediate their ends for uniformity but of course do not provide shoulders to bear outwardly on the rails.

The angle of the straight web members 33 and 34 and the angle of both portions of each web member 35 and 36 is 12° to 17° to an axially extending line. The end portions of the web members 33, 34 and 35 thus provide the desired angle for the shoulders 32 so that the shoulders do not have to be specially formed to provide this angle, as in the case of the shoulders 22 in the first-described form.

From the foregoing description, it will be apparent that I have provided a novel piston ring assembly utilizing rails that are radially narrower than those usually employed, but which provides sufficient radial width for the assembly as a whole to prevent difficulties from distortion of such rails.

I claim:

1. A piston ring assembly comprising a cylinder-engaging rail, and positioning and expanding means comprising a circumferentially expansible structure having portions extending axially and portions bent to extend radially outward from the first-mentioned portions for holding said rail at one side of said groove, and portions bent to form shoulders abutting the inner periphery of the rail to force it outwardly, said last-mentioned portions extending radially inward from said shoulders.

2. A piston ring assembly comprising a cylinder-engaging rail, and positioning and expanding means comprising a circumferentially expansible structure including axially extending web members, and two rows of segments connecting the web members at one side, one of said rows of segments extending radially outward from said web members to hold said rail at said one side, and the other row of segments extending radially inward from said members and forming shoulders abutting the inner periphery of said rail to force it outwardly.

3. A piston ring assembly comprising a cylinder-engaging rail, and positioning and expanding means comprising an axially extending web structure, a row of circumferentially spaced elements extending radially outward from said web structure for holding said rail at one side of the groove, a row of circumferentially spaced elements extending radially inward from said web structure and forming shoulders abutting the inner periphery of said rail to force it outwardly, the elements in each row being in staggered relation to those in the other row.

4. A piston ring assembly comprising a pair of axially spaced rails, and a spacer-expander comprising an axially extending structure, two axially spaced rows of rail supporting elements extending radially outward from said structure for holding said rails axially spaced, and two axially spaced rows of rail expanding elements abutting the inner peripheries of the respective rails and extending radially inward from said structure to increase the radial width of the assembly.

5. A piston ring assembly comprising a pair of axially spaced rails and a spacer-expander comprising a plurality of circumferentially spaced web members extending substantially axially and connected by segments at their ends, the segments at each end of certain of the web members extending alternately inwardly and outwardly from said web members, with the inwardly extending segments abutting the inner peripheries of the rails and the outwardly extending segments holding the rails axially spaced.

6. A piston ring assembly comprising a pair of axially spaced rails, and a spacer-expander comprising an axially extending portion having axially elongated slots extending from one side of the spacer-expander substantially to the other side, and portions extending both radially inward and radially outward from said axially extending portion at both sides of the spacer-expander, the portions extending radially inward being circumferentially offset from the portions extending radially outward.

7. A piston ring assembly comprising a pair of axially spaced rails, and a spacer-expander comprising a plurality of axially extending circumferentially spaced web members, and two rows of segments bent from said web members to extend radially inward from the web members at the respective sides of the spacer-expander to bear at their outer ends outwardly on the rails, and two rows of segments bent to extend radially outward from the web members at the respective sides of the spacer-expander to hold the rails axially spaced.

8. A piston ring assembly according to claim 7, in which the rows of inwardly bent segments lie in planes axially outside of the planes of the rows of outwardly bent segments.

9. A piston ring assembly comprising a pair of axially spaced rails, and a spacer-expander for forcing the rails outward and to cause the rails to dish toward the sides of the groove, said spacer-expander comprising two rows of segments at each side of the spacer-expander, one row at each side extending radially inward and the other row at each side extending radially outward, and a plurality of circumferentially spaced web members shaped to extend at an angle to the rails to cause them to dish.

10. A piston ring assembly according to claim 9, in which certain web members each connect two inwardly extending segments, other web members each connect an inwardly and an outwardly extending segment, and other web members each connect two outwardly extending web members.

11. A piston ring assembly according to claim 10, in which each web member connecting two inwardly extending segments and each web member connecting two outwardly extending segments are bent intermediate its ends.

12. A spacer-expander for a piston ring assembly having a pair of axially spaced rails, said spacer-expander comprising two axially spaced rows of segments for holding the rails axially spaced, two axially spaced rows of segments having shoulders for engaging the inner peripheries of the rails and extending inwardly from said shoulders, and web members connecting the segments.

13. A spacer-expander according to claim 12, in which the second-mentioned rows of segments are axially spaced apart a greater distance than the first-mentioned rows of segments.

14. A spacer-expander for a piston ring assembly having a pair of axially spaced rails, said spacer-expander comprising a plurality of web members extending generally axially, two series of segments connected to the web members at the respective ends thereof, the segments of each series being bent to extend alternately inwardly and outwardly from the web members.

15. A spacer-expander according to claim 14, in which the web members connected to the inwardly extending segments have their connecting end portions slanting inwardly.

References Cited in the file of this patent

UNITED STATES PATENTS

| | | |
|---|---|---|
| 2,220,948 | Paton | Nov. 12, 1940 |
| 2,397,220 | Teetor | Mar. 26, 1946 |
| 2,713,527 | Hsia-Si Pien | July 19, 1955 |
| 2,775,495 | Olson | Dec. 25, 1956 |
| 2,795,469 | Haling | June 11, 1957 |
| 2,817,565 | Heiss | Dec. 24, 1957 |
| 2,830,861 | Marien | Apr. 15, 1958 |
| 2,886,384 | Hamm | May 12, 1959 |
| 2,893,801 | Heid | July 7, 1959 |